United States Patent
Wu

(10) Patent No.: US 8,520,634 B2
(45) Date of Patent: Aug. 27, 2013

(54) ACTIVE/STANDBY OPERATION OF A FEMTOCELL BASE STATION

(75) Inventor: Huaming Wu, San Diego, CA (US)

(73) Assignee: Sierra Wireless, Inc., Richmond (CA)

(*) Notice: Subject to any disclaimer, the term of this patent is extended or adjusted under 35 U.S.C. 154(b) by 408 days.

(21) Appl. No.: 12/850,423

(22) Filed: Aug. 4, 2010

(65) Prior Publication Data

US 2012/0033611 A1  Feb. 9, 2012

(51) Int. Cl.
*H04W 4/00* (2009.01)

(52) U.S. Cl.
USPC .......................................... 370/331; 370/328

(58) Field of Classification Search
USPC .............. 370/328, 329, 331, 332; 455/422.1, 455/423, 424, 425, 435.1, 436, 440, 456.1
See application file for complete search history.

(56) References Cited

U.S. PATENT DOCUMENTS

| | | |
|---|---|---|
| 2002/0028655 A1 | 3/2002 | Rosener et al. |
| 2006/0234725 A1 | 10/2006 | Litwin |
| 2007/0014292 A1 | 1/2007 | Obata |
| 2007/0032225 A1 | 2/2007 | Konicek et al. |
| 2007/0135151 A1 | 6/2007 | Dendy |
| 2007/0167149 A1 | 7/2007 | Comstock et al. |
| 2007/0268876 A1 | 11/2007 | Yellin et al. |
| 2008/0032738 A1 | 2/2008 | Boyer et al. |
| 2008/0057912 A1 | 3/2008 | Deprun |
| 2008/0058031 A1 | 3/2008 | Deprun |
| 2008/0102787 A1 | 5/2008 | Landschaft et al. |
| 2008/0227386 A1 | 9/2008 | Dayal et al. |
| 2008/0305792 A1 | 12/2008 | Khetawat et al. |
| 2009/0058068 A1 | 3/2009 | Desjarlais et al. |
| 2009/0180448 A1 | 7/2009 | Kobayashi |
| 2009/0264126 A1 | 10/2009 | Khetawat et al. |
| 2009/0264154 A1 | 10/2009 | Rofougaran |
| 2009/0270132 A1* | 10/2009 | Nakayama .................... 455/561 |
| 2009/0291690 A1 | 11/2009 | Guvenc et al. |
| 2010/0041364 A1 | 2/2010 | Lott et al. |

(Continued)

FOREIGN PATENT DOCUMENTS

| | | |
|---|---|---|
| EP | 1777894 A2 | 4/2007 |
| JP | 2004/260258 A | 9/2004 |

(Continued)

OTHER PUBLICATIONS

"Dial-up internet connection via bluetooth and mobile phone," Discussion Forum, Tom's Hardware Guide, http://www.tomshardware.com/forum/24913-dial-internet-connection-bluetooth-mobile-phone, Mar. 23, 2009.

(Continued)

*Primary Examiner* — Michael Thier
*Assistant Examiner* — Feben M Haile
(74) *Attorney, Agent, or Firm* — Mintz, Levin, Cohn, Ferris, Glovsky and Popeo, P.C.

(57) ABSTRACT

The present invention provides a method and apparatus for operating a femtocell base station of a wireless communication system. A method of the present invention comprises obtaining a list of designated wireless devices capable of communication with the base station; counting the number of designated wireless devices currently within range of the base station; and switching the base station between an active state and a standby state based on the count. The base station may obtain information for counting wireless devices currently within range by monitoring the wireless environment, and/or by monitoring information received through a network interface.

21 Claims, 8 Drawing Sheets

(56) References Cited

U.S. PATENT DOCUMENTS

| | | | |
|---|---|---|---|
| 2010/0056184 A1* | 3/2010 | Vakil et al. | 455/456.5 |
| 2010/0062802 A1 | 3/2010 | Amram | |
| 2010/0167743 A1 | 7/2010 | Palanki et al. | |
| 2011/0003591 A1* | 1/2011 | Venkatachalam et al. | 455/434 |
| 2011/0010458 A1 | 1/2011 | Das et al. | |
| 2011/0143673 A1 | 6/2011 | Landesman et al. | |
| 2011/0228677 A1 | 9/2011 | Weigand | |
| 2012/0030734 A1* | 2/2012 | Wohlert | 726/4 |

FOREIGN PATENT DOCUMENTS

| | | |
|---|---|---|
| WO | WO-2006/095512 A1 | 9/2006 |
| WO | WO-2009058068 A1 | 5/2009 |
| WO | WO-2009/142425 A2 | 11/2009 |
| WO | WO-2010/049119 A1 | 5/2010 |
| WO | WO-2010/071347 A2 | 6/2010 |

OTHER PUBLICATIONS

"Ted's Bluetooth Guide for Pocket PC Devices," Aximsite.com—The Dell Axim Community, http://www.aximsite.com/bluetooth/bt_guide5.htm#section13, Mar. 23, 2009.

"Walking Hotspot," Discussion Forum, Geekzone, http://www.geekzone.co.zn/forums.asp?ForumID=66&TopicID=21361, Mar. 23, 2009.

"Unleashing the Power of the Mobile Web—walkinghotspotTM Whitepaper," Mike Linstrom, Taproot Systems, Inc., www.taprootsystems.com, 2008.

"Scenarios for Network Composition in Ambient Networks: a new paradigm for Internetworking," Rui Campos, Nadeem Akhtar, Carlos Pinho, José Ruela, Manuel Ricardo, Cornelia Kappler, Cornel Pampu, Louise Burness, Philip Eardley, Petteri Pöyhönen, Paulo Mendes, Di Zhou, Marian Ángeles Callejo Rodríguez, Jorge Andrés Colás, Linghang Fan, Laura Feeney Roger Kalden, Pekka Koskela, Gösta Leijonhuvud, Klaus Mössner, Janne Riihijarvi, Morten Schläger and Brynjar-Age Viken, Proceedings of the 11th WWRF meeting, Oslo, Norway, Jun. 2004.

"How to Use a Bluetooth Enabled Cell Phone," Catherine Roseberry, About.com, 2009.

"Tethering Solution for Verizon XV6700," Discussion Forum, PDAphoneHome.com, htpp:/pdaphonehome.com/forums/ppc-6700-xv6700/64889-bluetooth-dun-tethering-solution-verizon-xv6700-codes-method.html, May 14, 2009.

"Pocket PC Phone Reviews—UT Starcom / Verizon XV6700," Lisa Gade, Mobile Tech Review, Jan. 25, 2006.

"Secure Mobile WLAN HotSpot in Mobile Phone," JoikuSpot 2.30 WhitePaper, Joikusoft Oy ltd., 2008.

S. Jung et al., "Proposed IEEE 802.16m Amendment Text on Femtocell BS Support", ETRI, Jul. 6, 2009.

M. Venkatachalam, "802.16m Changes to Femto Drafting Group Output text", Intel Corporation, Jul. 16, 2009.

V. Chandrasekhar et al., "Power control in two-tier femtocell networks", IEEE Transactions on Wireless Communications, vol. 8, Issue 8 (Aug. 2009).

J. Torregoza, et al., "Joint Power Control, Base Station Assignment, and Channel Assignment in Cognitive Femtocell Networks", EURASIP Journal on Wireless Communications and Networking, vol. 2010 (2010).

3GPP TS 25.367 V9.2.0, "Technical Specification Group Radio Access Network Mobility Procedures for Home Node B Overall Description," 3rd Generation Partnership Project, Stage 2 (Release 9), Dec. 2009.

3GPP TS 25.467 V9.1.0, "Technical Specification Group Radio Access Network UTRAN architecture for 3G Home Node B (HNB)," 3rd Generation Partnership Project, Stage 2 (Release 9), Dec. 2009.

3GPP TS 25.469 V9.0.0, "Technical Specification 3rd Generation Partnership Project; Technical Specification Group Radio Access Network UTRAN luh interface Home Node B Application Part (HNBAP) signalling," 3rd Generation Partnership Project, (Release 9), Dec. 2009.

"Vodafone Using Ericsson's New Power-saving Base Station Feature", retrieved from the Internet on Jan. 20, 2011, <http://www.3g.co.uk/PR/Dec2007/5524.htm>.

"Alcatel-Lucent Says Base-Station Upgrade Can Cut Power Use 27%", retrieved from teh Internet on Jan. 20, 2011, <http://www.environmentalleader.com/2009/02/19/alcatel-lucent-says-base-station-upgrade-can-cut-power-use-27/>.

* cited by examiner

ACTIVE/STANDBY OPERATION OF A FEMTOCELL BASE STATION

FIELD OF THE INVENTION

The present invention pertains in general to wireless communications and in particular to methods, apparatus and computer program products related to operation of a femtocell base station.

BACKGROUND

Femtocell is a technology that allows users of wireless devices, such as cell phones, PDAs, laptops equipped with cellular communications capabilities, or the like, to install small base stations in the indoor environment using licensed spectrum in order to increase coverage and/or throughput. Femtocells may provide access between a wireless device and a mobile network operator (MNO) core network. For example, the femtocell may be coupled to the operator core network through the Internet. Femtocell base stations may be installed by customers of MNOs on the customer's premises. Aspects such as energy consumption and electromagnetic emission may therefore be important factors for customer acceptance of femtocell products. FIG. 1 illustrates a femtocell base station 110 operatively coupled to an operator core network 120 via an Internet connection 130. The femtocell 110 may operate as a base station for a wireless device 140. Alternatively, a macrocell 150 may operate as a base station for the wireless device 140.

Some technical standards related to Femtocell technology include 3GPP TS 25.367 V9.2.0, "Technical Specification Group Radio Access Network; Mobility Procedures for Home NodeB; Overall Description," 3rd Generation Partnership Project, Stage 2 (Release 9), December, 2009; 3GPP TS 25.467 V9.1.0, "Technical Specification Group Radio Access Network; UTRAN architecture for 3G Home Node B (HNB)," 3rd Generation Partnership Project, Stage 2 (Release 9), December, 2009; and 3GPP TS 25.469 V9.0.0, "Technical Specification 3rd Generation Partnership Project; Technical Specification Group Radio Access Network; UTRAN Iuh interface Home Node B Application Part (HN-BAP) signalling," 3rd Generation Partnership Project, (Release 9), December, 2009.

There are several differences between a femtocell base station and a traditional cellular base station. A femtocell base station typically connects to the core network using a broadband Internet connection such as DSL, cable or Optical Fibre. Additionally, a femtocell base station may be placed in a user's home or an office building, and typically does not belong to nor is it under direct control of a MNO. For example, an owner of a femtocell base station may want to restrict access to their femtocell since they pay the expense of maintenance and the broadband connection to their premises. As such, a closed subscriber group (CSG) is defined in 3GPP and other standard bodies (e.g., IEEE 802.16m) for a femtocell base station. In other words, a femtocell base station is typically accessible only to terminals which are members of this base station, except for emergency services.

The traditional practice of having radio equipment continually turned on can result in energy being wasted. In addition to wasting energy, always-on radio equipment can increase radio interference and radio emissions in nearby areas.

Some power-saving techniques have been proposed for non-femtocell base stations, such as macrocells. For example, Ericsson™ has introduced a Base Transceiver Station Power savings feature, wherein, during periods of low network traffic, those parts of the network that are not being used may be powered down. Alcatel-Lucent™ offers a feature called Dynamic Power Save which enables a GSM base station to monitor traffic activity on the network and switch off the amplifier when there is no information to transmit. However, these approaches are unsuitable for femtocell base stations, for example since they may require knowledge of the network traffic load and full ownership of the base stations by the MNO. Furthermore, such solutions may not fully leverage the potential capabilities of a femtocell, for example as enabled by the availability of closed subscriber groups.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for active/standby operation of a femtocell base station. According to an aspect of the present invention there is provided a method for operating a femtocell base station, the method comprising: obtaining a list of one or more designated wireless devices capable of wireless communication with the femtocell base station; determining an operating condition of the femtocell base station, the operating condition indicative of a count of the designated wireless devices which are in a condition for wireless communication with the femtocell base station; and switching the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state.

According to another aspect of the present invention there is provided a femtocell base station comprising: a wireless interface configured for wireless communication with one or more wireless devices when the femtocell base station is in an active state; a network interface coupled to the wireless interface; the network interface configured for communicative coupling with a communication network; and a control module operatively coupled to one or both of the wireless interface and the network interface, the control module configured to: obtain a list of one or more designated wireless devices capable of wireless communication with the femtocell base station; determine an operating condition of the femtocell base station, the operating condition indicative of a count of the designated wireless devices which are in a condition for wireless communication with the femtocell base station; and switch the femtocell base station between an active state and a standby state based on the operating condition, wherein the femtocell base station facilitates communication between one or more wireless devices and the communication network when in the active state, and wherein the standby state corresponds to reduced operation of the femtocell base station compared with the active state.

According to another aspect of the present invention there is provided a computer program product comprising a memory having computer readable code embodied therein, for execution by a CPU, for performing a method for operating a femtocell base station, the method comprising: obtaining a list of one or more designated wireless devices capable of wireless communication with the femtocell base station; determining an operating condition of the femtocell base station, the operating condition indicative of a count of the designated wireless devices which are in a condition for wireless communication with the femtocell base station; and switching the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state.

DETAILED DESCRIPTION OF THE INVENTION

Definitions

Figure 1:
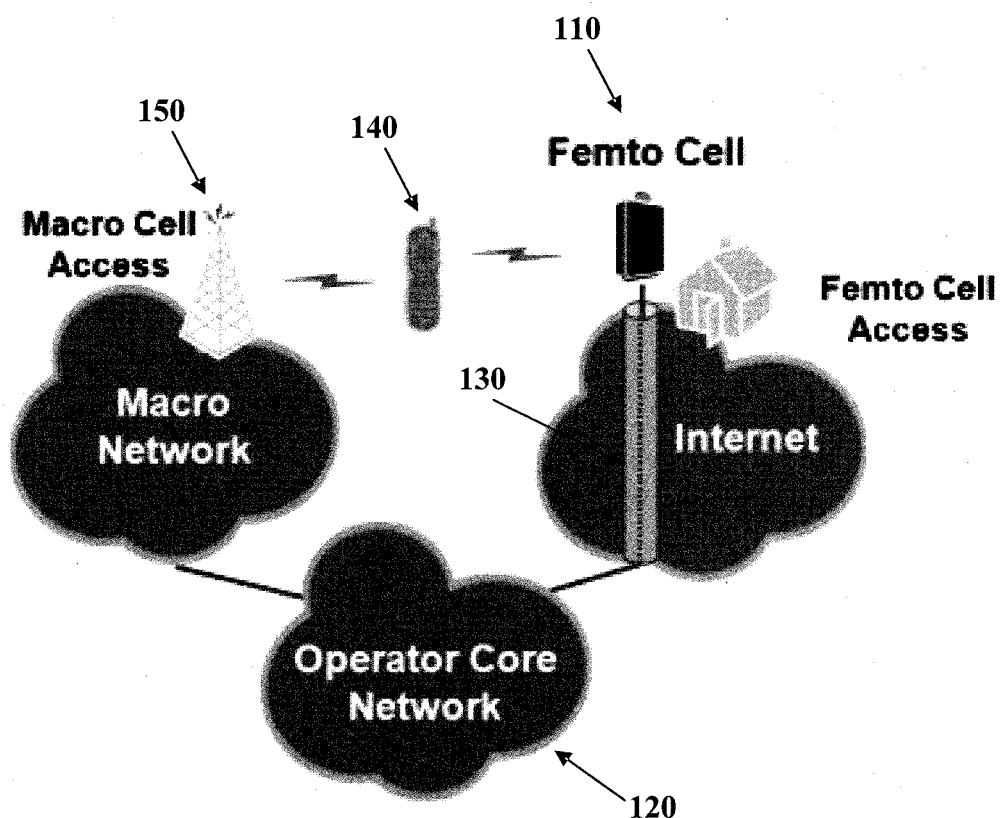
FIG. 1 illustrates a network including a femtocell in accordance with the prior art.

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. A wireless device may use signals formatted according to one or more of a number of communication systems including mobile phone networks such as cellular networks, or other current or future wireless communication systems, for example. A wireless device can comprise or be included in one or more of various forms of handheld/mobile and/or stationary communication, control and/or computing devices such as a meter reader, teller machine, vehicle or goods tracker or theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example.

The term "base station" is used to refer to a wireless device operating as an access point for coupling other wireless devices, such as mobile phones, to other parts of a communication network. The base station comprises a radio transceiver for communication with the other wireless devices in accordance with one or more wireless communication protocols, for example cellular communication protocols such as CDMA, UMTS, GSM, or other wireless protocols. The base station further comprises an interface to a wired or wireless backhaul, backbone or other infrastructure for coupling with the other parts of the communication network, such as a mobile network operator's core network, the Internet, or a combination thereof, or the like. A base station may be, for example, a wireless access point, a femtocell base station, a base transceiver station, a NodeB, or the like.

The terms "femtocell base station" and "femtocell" are used interchangeably to refer to a base station which facilitates providing communication services to wireless devices within a local environment, such as an indoor environment. A femtocell may be operatively coupled to the wireless devices using a lower-power wireless transceiver compared to traditional macrocell base stations, and a femtocell may be operatively coupled to other parts of a communication network via a broadband Internet connection, for example, such as an Internet connection over a digital subscriber line/twisted pair telephone line, coaxial cable, or optical fiber medium.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method, apparatus and computer program product for active/standby operation of a femtocell. A method in accordance with an aspect of the present invention comprises obtaining a list of one or more designated wireless devices capable of wireless communication with the femtocell base station. The method comprises then determining an operating condition of the femtocell base station. The operating condition is indicative of a count of the designated wireless devices which are in a condition for wireless communication with the femtocell base station. The method comprises switching the femtocell base station between an active state and a standby state based on the operating condition. The femtocell base station facilitates communication between one or more wireless devices and a communication network when in the active state. The standby state corresponds to reduced operation of the femtocell base station compared with the active state.

A femtocell in accordance with the present invention comprises a wireless interface, a network interface, and a control module, operatively interconnected. The wireless interface is configured for wireless communication with one or more wireless devices at least when the femtocell base station is in an active state. The network interface is configured for communicative coupling with a communication network. The control module is configured to obtain a list of one or more designated wireless devices capable of wireless communication with the femtocell base station. The control module is further configured to determine an operating condition of the femtocell base station, when the operating condition is indicative of a count of the designated wireless devices which are in a condition for wireless communication with the femtocell base station. The control module is further configured to switch the femtocell base station between an active state and a standby state based on the operating condition. The femtocell base station facilitates communication between one or more wireless devices and the communication network when in the active state. The standby state corresponds to reduced operation of the femtocell base station compared with the active state.

In accordance with embodiments of the present invention, a femtocell may be switched between an active state and a standby state. In the active state, the femtocell base station may function normally, for example transmitting and receiving on the wireless interface and routing data via the network interface. For example, in the active state, the femtocell may actively communicate with one or more wireless devices, for example facilitating downloading and/or uploading of data. In the active state, the femtocell may be associated with wireless devices even if they are not generating data traffic, for example wireless devices turned on but not currently engaged in a call. A wireless device may connect to the femtocell as would be readily understood in the art when the femtocell base station is in the active state. In the standby state, at least the transceiver of the femtocell base station may be powered down for predetermined time periods. During these time periods, the femtocell stops transmitting and receiving on the wireless interface. A wireless device may not be able to connect to the femtocell as usual when the transceiver is powered down, but may have to wait for the transceiver to power on or "wake up" temporarily during the standby state, or to enter the active state.

In some embodiments, the standby state of the femtocell corresponds to both the transmitter and the receiver of the wireless interface being always powered down. This may, for example, offer further power savings and reduced radio activity over situations wherein the receiver remains on during standby, or wherein the receiver turns on periodically during standby.

To enable the femtocell to switch from the standby state to the active state, some embodiments of the present invention are configured to utilize the network interface to obtain information indicative of an operating condition of the femtocell. For example, the femtocell may use the network interface to page designated wireless devices to determine their location, query a local or remote database tracking the location of designated wireless devices, monitor for messages indicative of location of designated wireless devices, or the like, or a combination thereof. As described herein, use of the network interface to determine a count of the designated wireless devices which are in a condition for wireless communication with the femtocell base station a paging method, a member self-updating method, and/or a network assisted method, for example. In some embodiments, use of the network interface in such a manner may enable the femtocell to switch from the standby state to the active state even without necessarily using of the receiver of the wireless interface to determine or verify a count of designated wireless devices within range. In further embodiments, determining an operating condition of the femtocell may rely exclusively on use of the network interface.

Embodiments of the present invention exploit the fact that the femtocell may be configured such that only a closed subscriber group, or a limited set of wireless devices designated on a list, may use the femtocell. For example, embodiments of the invention may facilitate powering down a femtocell base station when all the designated wireless devices on a list are out of communication range of the femtocell, indicating that all the users in the closed subscriber group are not at home. Doing such will not only save energy but also reduce interference, and thus may further improve network capacity. Furthermore, embodiments of the present invention provide one or more ways for determining when to switch between the active state and the standby state of the femtocell.

Embodiments of the present invention facilitate a reduction in power consumption by placing the femtocell in standby state when appropriate, which may also reduce radio interference and radio emissions. In accordance with embodiments of the present invention, the femtocell base station may exploit information regarding association of its designated wireless devices with other base stations, to facilitate determining whether to be in active state or standby state. For example, this may reduce the chance a femtocell base station enters standby state while a member is temporarily turned off but still in the femtocell's vicinity. In accordance with embodiments of the present invention, the femtocell may be woken up either periodically or upon receipt of a signal from an auxiliary device associated with the network operator's core network. Wake-up operations may be configured so as to appropriately manage a time delay experienced by a designated wireless device when joining the femtocell. One or more different methods, for example as described herein, may be used for determining information regarding cell associations of designated wireless devices, which may, in some cases, work without signalling or assistance from the core network.

In some embodiments, wake-up operations may occur in accordance with a schedule. This schedule may adapt based on cell association or other location information regarding the designated wireless devices. For example, assuming all the designated wireless devices are currently out of range of the femtocell, the femtocell may receive information, via its network interface, indicative of which base stations or cells these designated wireless devices are currently associated with. Based on this information, a determination may be made as to an anticipated or estimated amount of time that may elapse before a designated wireless device returns to the femtocell. The femtocell may adjust its wake-up operations based on this amount of time. For example, if all designated wireless devices are in a foreign country, the femtocell may suspend wake-up operations for several hours. Then, when the designated wireless devices are subsequently unaccounted for, the femtocell may increase the frequency of wake-up operations in anticipation of their return.

Figure 2:
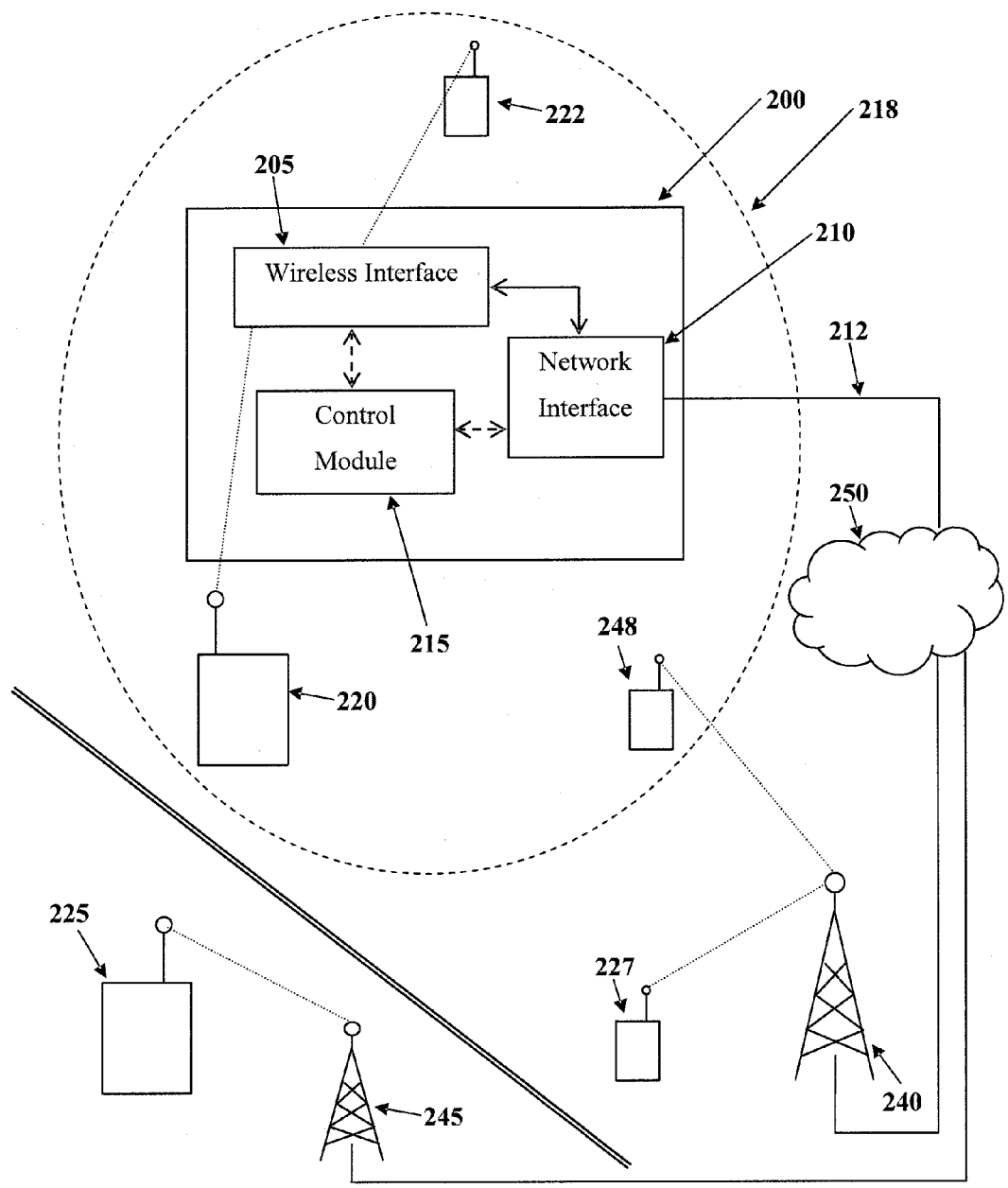
FIG. 2 illustrates a femtocell base station and associated devices in accordance with embodiments of the present invention.

FIG. 2 illustrates a femtocell base station 200 for facilitating communication between one or more wireless devices 220, 222 and a communication network 250, in accordance with embodiments of the present invention. The femtocell base station 200 comprises a wireless interface 205, a network interface 210, and a control module 215. The wireless interface 205 is configured for wireless communication with one or more wireless devices when the femtocell base station is in an active state. The network interface 210 is coupled to the wireless interface 205 and is configured for communicative coupling with a communication network 250 via a communication medium 212 such as comprising a backhaul, one or more wired or wireless data links, or the like. The control module 215 is operatively coupled to one or both of the wireless interface 205 and the network interface 210.

The control module 215 is configured to obtain a list of one or more designated wireless devices 220, 222, 225 and 227, capable of wireless communication with the femtocell base station. The control module 215 is further configured to determine an operating condition of the femtocell base station 200, the operating condition indicative of a count of the designated wireless devices 220, 222, 225 and 227 which are in a condition for wireless communication with the femtocell base station 200. For example, a wireless device can be considered to be in a condition for wireless communication with the femtocell if it is detected to be within range of the femtocell. The control module 215 is further configured to switch the femtocell base station 200 between an active state and a standby state based on the operating condition. The femtocell base station 200 facilitates communication between one or more wireless devices and the communication network when in the active state. The standby state corresponds to reduced operation of the femtocell base station 200 when compared with the active state. For example, the standby state may be a low-power or sleep state, wherein the wireless interface 205 is powered down at least during some predetermined time intervals.

In the standby state, the femtocell 200 may be configured to temporarily power on at least receiving functionality of its wireless interface 205 periodically, in accordance with a dynamically determined schedule, in response to a wake-up signal received via the network interface 210, or the like. When the wireless interface is powered on, the femtocell may determine whether there are any designated wireless devices within range of the femtocell. In some embodiments, this temporary powered-on sub-state of the standby state may substantially correspond to the active state, or to a wake-up state corresponding to full or reduced functionality of the femtocell. Alternatively, the wireless interface transmitter and receiver may remain powered down during the standby state, and the network interface may be used to determine conditions under which the femtocell is to return to the active state.

Figure 3:
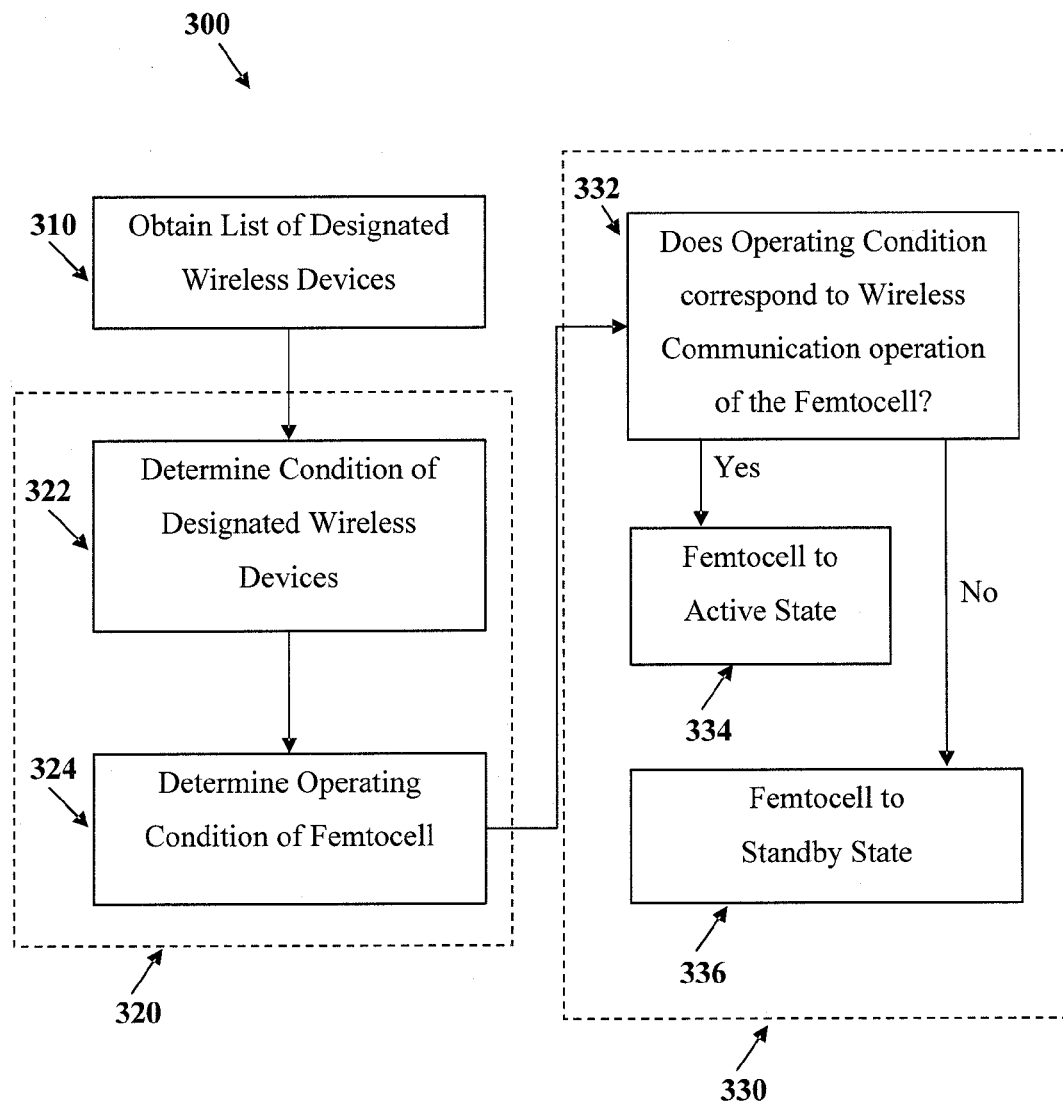
FIG. 3 illustrates a method for operating a femtocell base station in accordance with embodiments of the present invention.

FIG. 3 illustrates a method 300 for operating a femtocell base station, such as the femtocell base station 200 illustrated in FIG. 2, in accordance with embodiments of the present invention. The method 300 may, for example, be carried out at least in part by the control module 215 of the femtocell. The method 300 comprises obtaining 310 a list of designated wireless devices. For example, the list of designated wireless devices may correspond to a closed subscriber group associated with the femtocell. The method 300 comprises determining 320 an operating condition of the femtocell, the operating condition indicative of a count of the designated wireless devices of the list 310 which are in a condition for wireless communication with the femtocell. For example, as illustrated in FIG. 3, determining 320 may comprise first determining 322 conditions of the designated wireless devices of the list 310, and determining 324 the operating condition of the femtocell based on said determined conditions. The method 300 further comprises switching 330 the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state. For example, as illustrated in FIG. 3, switching 330 may comprise determining 332 if the determined operating condition corresponds to wireless communication operation of the femtocell, and, if so, shifting 334 the femtocell to the active state if it is not already in the active state, and otherwise shifting 336 the femtocell to the standby state if it is not already in the standby state. The determined operating condition may, for example, be determined to correspond to wireless communication operation of the femtocell if services of the femtocell are required by one or more designated wireless devices within range of the femtocell.

The list of designated wireless devices may be pre-programmed by a user, generated by one or more registration operations for "pairing" selected wireless devices with the femtocell, provided as one or more messages propagated from the network, or the like. The list may comprise identifiers of the designated wireless devices, such as phone numbers, electronic serial numbers (ESN), international mobile equipment identities (IMEI), international mobile subscriber identities (IMSI), or the like. The list of designated wireless devices may correspond to a closed subscriber group associated with the femtocell.

FIG. 2 additionally illustrates links between several wireless devices 220, 222, 225, 227 and 248 and several base stations 200, 240 and 245 operatively coupled to the communication network 250. The various links represent examples illustrating potential features in accordance with embodiments of the present invention, as described below.

As illustrated in FIG. 2, the wireless devices 220 and 222, which are on the list of designated wireless devices, are within range of the femtocell 200 and communicate with the femtocell 200 when active. The range of the femtocell 200 is illustrated by perimeter 218. Since at least one designated wireless device is within range of the femtocell 200, the control module, as configured in accordance with some embodiments of the present invention, is configured to ensure that the femtocell is in the active state, for example by powering on the wireless interface 205 if it is not already powered on. If the femtocell scans for wireless devices within communication range, for example upon a wake-up event from the standby state, it will typically detect the wireless devices 220 and 222.

As also illustrated in FIG. 2, the wireless device 248 is also within range of the femtocell 200, but since this wireless device is not on the list of designated wireless devices, it does not affect the operating condition of the femtocell 200. In various embodiments, and/or depending on settings or access rules, the femtocell 200 may be configured to operate as a base station for such a non-designated wireless device 248, or the femtocell 200 may be configured to deny operating as a base station for the wireless device 248. As illustrated, the wireless device is operatively coupled to another base station 240. In some embodiments, the femtocell 200 may report the presence of wireless device 248 to a global database.

As also illustrated in FIG. 2, the wireless device 225 is communicatively coupled with a base station 245 which is geographically distant from the femtocell 200. For example, the base station 245 may be in another city or country, but is operatively coupled to the communication network 250 and via same to the femtocell 200. The femtocell 200 may receive a notification indicative that the wireless device 225 is geographically distant from the femtocell 200, and in response to this may refrain from searching for the wireless device 225 locally for as long as the notification remains valid, and/or for a predetermined period of time afterwards. In some embodiments, the predetermined period of time afterwards may depend on the geographic distance involved. For example, if the femtocell 200 receives a notification indicating that the wireless device 225 is in another country, it may refrain from searching for the wireless device 225 locally for at least 6 hours. A global database, stored in the operator's core network, or a local database or list, stored in the femtocell 200 may be used to track the location of remote wireless devices such as wireless device 225.

As also illustrated in FIG. 2, the wireless device 227 is close to but out of range 218 of the femtocell 200 and is instead operatively coupled to the nearby base station 240. The femtocell may receive a notification via the communication network 250 of this situation and may respond by frequently searching for the wireless device 227, since it is close to the range 218 of the femtocell 200. The notification may be generated by an auxiliary device in the communication network 250, for example a device associated with the operator's core network.

Determining Condition for Wireless Communication

The present invention involves determination of an operating condition of the femtocell base station, which is indicative of a count of the designated wireless devices which are in a condition for wireless communication with the femtocell base station. Determining whether a wireless device is in a condition for wireless communication with the femtocell may be performed using one or more methods. Four such methods are described below, although other methods may also be used. For improved operation, two or more methods may be used in conjunction. For example the scanning method may be followed by the paging method or a database query, to verify an operating condition of the femtocell.

In some embodiments, one or more methods may be based at least in part on network-provided information, for example information received via the network interface of the femtocell. In some cases, this network-provided information may affect execution of the method, for example by influencing a schedule of wake-up events for performing the scanning method or a related direct method for determining presence of designated wireless devices within range of the femtocell. In some cases, the network-provided information may provide information indicative of the location of the designated wireless devices which is directly used to determine an operating condition of the femtocell. For example, this information may include network messages indicative of responses to pages, updates to a database tracking wireless device locations, or contents of a database tracking wireless device locations. In each case, the femtocell network interface may be configured to remain substantially active for at least predetermined time intervals during standby mode of the femtocell, even while the femtocell wireless interface is powered down.

Determining whether a wireless device is in a condition for wireless communication with the femtocell generally comprises determining conditions such as: whether a specified wireless device is within range of the femtocell, whether the device is powered on, whether the device is currently associated with a nearby or distant femtocell or macrocell, whether the device is ready for handover or connection to the femtocell, whether the device has selected the femtocell as a preferred base station, and the like. These conditions may be determined via the wireless interface and/or the network interface of the femtocell.

The femtocell may be configured to perform one or more methods for determining an operating condition in accordance with a periodic or dynamically determined schedule. For example, the femtocell may schedule one or more wake-up events, wherein the femtocell performs methods such as the scanning method at each wake-up event.

In accordance with embodiments of the present invention, the time interval between wake-up events of the femtocell may be static or dynamic. For example, the time interval may be specified as a static value in the femtocell, possibly user-configurable. The time interval may alternatively change dynamically in accordance with a predetermined update rule, for example based on feedback related to usage history of the designated wireless devices, feedback obtained by paging wireless devices, or the like. In some embodiments, determining the operating condition, for example via wake-up events, is performed in accordance with a schedule. The schedule may be determined dynamically based at least in part on location information related to the one or more designated wireless devices. For example, wake-up events may be scheduled relatively infrequently when all of the designated wireless devices are in other locations relatively distant from the femtocell. As more designated wireless devices are determined to be in locations closer to the femtocell, wake-up events may be increased in frequency.

Scanning Method

In some embodiments, determining whether a wireless device is in a condition for wireless communication with the femtocell comprises executing a scanning method. In the scanning method, the femtocell base station is configured to check whether one or more specified designated wireless devices are currently within communication range of the femtocell by using its wireless interface to attempt wireless communication with these devices. Wireless devices within communication range include device which are currently connected to the femtocell as well as wireless devices which are within communication range of the femtocell but not currently connected to the femtocell. In some embodiments, scanning is used as a primary method for determining an operating condition of the femtocell.

In some embodiments, a network-based method, such as a paging method, member self-updating method or network-assisted method is used as a primary method for determining an operating condition of the femtocell when the femtocell is in the standby state. In further embodiments, the scanning method may be used as a secondary method in the standby state, for example to verify an operating condition determined in accordance with a network-based method. Alternatively, the scanning method may not be used during the standby state. Additionally, in some embodiments, the scanning method may be used as a primary or secondary method for determining an operating condition of the femtocell when the femtocell is in the active state.

In some embodiments, the femtocell may be configured to perform explicit or implicit scanning during an active state. The femtocell may be configured to transition from the active state to a standby state when, based at least on a scan, it is determined that all designated wireless devices are not currently communicating through the femtocell, and/or are out of range of the femtocell.

In some embodiments, the femtocell may be configured to perform scanning during a standby state, for example during scheduled wake-up events. The femtocell may be configured to transition from a standby state to an active state when, based on such a scan, one or more designated wireless devices are determined to be in a condition for wireless communication with the femtocell. In some embodiments, scheduling of the wake-up events may be dynamically adjusted in accordance to information received via the network interface, such as information relevant to the location of the designated wireless devices.

Paging Method

In some embodiments, determining whether a wireless device is in a condition for wireless communication with the femtocell comprises executing a paging method. In the paging method, the femtocell base station is configured to check to see if one or more wireless devices are connected to other macrocells or femtocells by explicitly paging the wireless devices through the core network. Paging of a wireless device may be performed using standard methods as would be readily understood by a worker skilled in the art.

In some embodiments, the paging method is performed after the scanning method. For example, the scanning method may be performed to determine which, if any, designated wireless devices are currently within range of the femtocell. Paging may then be performed to determine the location of one or more designated wireless devices not currently in range.

In some embodiments, the paging method is performed before the scanning method. For example, the paging method may be performed to determine which, if any, designated wireless devices are currently or possibly within range of the femtocell. Scanning may then be performed to verify the presence of one or more designated wireless devices which have at least a predetermined likelihood of being currently in range of the femtocell. In some embodiments, this order of operations is used in the standby state but not necessarily in the active state.

In some embodiments, the femtocell base station may use the paging method to determine whether all of the designated wireless devices are currently out of communication range of the femtocell. That is, the femtocell may determine an operating condition indicative of whether the count of designated wireless devices which are currently in a condition for wireless communication with the femtocell is zero or nonzero. If the count is zero, the femtocell base station may switch to the standby state. When in the standby state, the femtocell base station may be configured to wake up periodically and perform the paging method or another method to determine if any designated wireless devices are currently within communication range of the femtocell.

In some embodiments, the paging method does not require signalling over the backhaul portion of the network in order to determine where the one or more designated wireless devices are located.

Due to communication network limitations, there may be a substantial delay between paging of a wireless device and the receipt of its response to the page. In some embodiments, the femtocell may wait for all paging responses before determining its operating condition. In some embodiments, the femtocell may determine an interim operating condition regardless of whether all paging responses have been received. For example, the femtocell may switch to a standby state, with its wireless interface powered down, but with its network interface powered on to receive the paging responses. Once the paging responses are received, the femtocell may reconfigure its operating condition if necessary.

Member Self-Updating Method

In some embodiments, determining whether a wireless device is in a condition for wireless communication with the femtocell comprises executing a member self-updating method. In this method, each designated wireless device of a femtocell is configured to transmit an update message to the femtocell in the event that it joins another femtocell or macrocell. Such an update message may be transmitted to the femtocell via the communication network and/or via the Internet.

The femtocell base station may be configured to maintain, in memory, a locally stored list or database indicative of the cell association status of designated wireless devices. The list or database may be updated on receipt of update messages. Counting designated wireless devices which are in a condition for wireless communication with the femtocell may comprise reading entries in the list or database.

In some embodiments, a local list or database check is performed after the scanning method. For example, the scanning method may be performed to determine which, if any, designated wireless devices are currently within range of the femtocell. A local list or database check may then be performed to determine the location of one or more designated wireless devices not currently in range.

In some embodiments, a local list or database check is performed before the scanning method. For example, the local list or database check may be performed to determine which, if any, designated wireless devices may be currently within range of the femtocell. A scan may then be performed to verify the location of one or more designated wireless devices which have at least a predetermined likelihood of being currently in range of the femtocell. In some embodiments, this order of operations is used in the standby state but not necessarily in the active state.

For wireless devices not currently in range, the femtocell base station may then check to see if such wireless devices are connected to other macrocells or femtocells by checking the local list or database indicative of the cell association status of designated wireless devices.

In some embodiments, the femtocell base station may use the member self-updating method to determine whether all of the designated wireless devices are currently out of communication range of the femtocell. That is, the femtocell may determine an operating condition indicative of whether the count of designated wireless devices which are currently in a condition for wireless communication with the femtocell is zero or nonzero. If the count is zero, the femtocell base station may switch to the standby state. When in the standby state, the femtocell base station may be configured to wake up periodically and perform the member-self-updating method or another method to determine if any designated wireless devices are currently within communication range of the femtocell.

In some embodiments, the member self-updating method does not require signalling over the backhaul portion of the network in order to determine where the one or more designated wireless devices are located.

Network-Assisted Method

In some embodiments, determining whether a wireless device is in a condition for wireless communication with the femtocell comprises executing a network-assisted method. In the network assisted method, the femtocell accesses a global database maintained by the network operator, for example in a core network thereof. The global database holds information regarding current associations for a substantial proportion of wireless devices and base stations serviced by the network operator and/or other network operators. Such a global database may be pre-existing and used to support operations of the network operator. The global database may be dynamically updated as associations between wireless devices and base stations change. For the network-assisted method, the global database is made accessible, for example to a limited extent, to the femtocell, which accesses the database via communication with the network operator's core network, for example, or which receives messages indicative of data within the database, for example periodically or upon occurrence of one or more predetermined events. For security purposes, a femtocell may only be allowed access to information associated with its designated wireless devices. The network-assisted method may require cooperation of the network operator, for example to grant access to the global database in accordance with predetermined security and other policies. Counting designated wireless devices which are in a condition for wireless communication with the femtocell may comprise reading entries in the global database.

In some embodiments, while a femtocell is in the standby state, a network-assisted method may comprise determining if a designated wireless device is associated with a nearby macrocell or femtocell, and, if so, switching the femtocell to the active state. In some embodiments, this determination may be made on an auxiliary device communicatively coupled to the femtocell via the communication network, for example a computer device or server residing in the network operator's core network. The auxiliary device may be configured to cause the femtocell to switch to the active state by transmitting a Wake-up Over the Link (WOL) signal through the Internet, for example. This approach may reduce delays experienced in switching the femtocell to the active state, since the femtocell need not wait for a periodic wake-up event to determine if a designated wireless device is currently within communication range of the femtocell.

In some embodiments, the WOL signal or a similar signal may be transmitted to the femtocell via Bluetooth or another type of out-of-band communication method. The femtocell may be configured to continuously or periodically activate appropriate out-of-band receivers to enable receipt of such signals.

In some embodiments, a network database check is performed after the scanning method. For example, the scanning method may be performed to determine which, if any, designated wireless devices are currently within range of the femtocell. A network database check may then be performed to determine the location of one or more designated wireless devices not currently in range.

In some embodiments, a network database check is performed before the scanning method. For example, the network database check may be performed to determine which, if any, designated wireless devices may be currently within range of the femtocell. A scan may then be performed to verify the location of one or more designated wireless devices which have at least a predetermined likelihood of being currently in range of the femtocell. In some embodiments, this order of operations is used in the standby state but not necessarily in the active state.

In some embodiments, the femtocell base station may use the network-assisted method to determine whether all of the designated wireless devices are currently out of communication range of the femtocell. That is, the femtocell may determine an operating condition indicative of whether the count of designated wireless devices which are currently in a condition for wireless communication with the femtocell is zero or nonzero. If the count is zero, the femtocell base station may switch to the standby state. When in the standby state, the femtocell base station may be configured to wake up periodically and perform the network-assisted method or another method to determine if any designated wireless devices are currently within communication range of the femtocell.

In some embodiments, when using the network-assisted method, the femtocell may rely on one or more auxiliary devices to transmit wake-up messages to the femtocell when appropriate, for example when a designated wireless device is associated with a nearby base station. In this mode of operation, periodic wake-up of the femtocell, involving powering on of the wireless interface and scanning for wireless devices in range of the femtocell, may not be required. An auxiliary device may be a remote server or a collection of remote servers, for example within an operator core network. An auxiliary device may hold a copy of at least a portion of the network database in memory, or otherwise be operatively coupled to the network database.

In some embodiments, an auxiliary device may transmit signals indicative of the distance to one or more of the designated wireless devices, and this signal may be used to modify the frequency of wake-up events of the femtocell to scan for nearby designated wireless devices.

In some embodiments, if an auxiliary device determines that a designated wireless device is not currently associated with any other base station, it may transmit a wake-up message to the femtocell. This may be advantageous when the femtocell operates in an area that is not covered by other base stations, for example indoors or in a remote location. If the femtocell wakes up and scans for but does not find the wireless device, it may be configured to schedule another wake-up and scan operation at a future time.

Operating Condition and Count

In some embodiments, the operating condition is a binary condition, indicative of whether the count of the designated wireless devices which are in a condition for wireless communication with the femtocell base station is zero, or whether the count of the designated wireless devices which are in a condition for wireless communication with the femtocell base station is greater than zero.

Counting may comprise one or more of: searching for wireless communication signatures of designated wireless devices, querying the network, querying memory holding results of messages received from the network, and/or performing one or more of the above-described methods, such as the paging method, member self-updating method and the network assisted method.

In some embodiments, and/or under some conditions of some embodiments, the count of the designated wireless devices which are in a condition for wireless communication with the femtocell base station is a full or exhaustive count of all designated wireless devices. That is, all the designated wireless devices in the list are considered in the count, with regards to whether each wireless device is in a condition for wireless communication with the femtocell base station.

For example, a full or exhaustive count may proceed by: (a) setting a counter c to zero; (b) setting an index variable j to 1, where the list of designated wireless devices is an ordered list having N entries; and (c) for j from 1 to N, checking whether the $j^{th}$ wireless device in the list is in a condition for wireless communication with the femtocell base station, and, if so, incrementing the counter c by one. A full or exhaustive count may be used when the femtocell is in the active state, so that the femtocell remains in the active state unless all of the designated wireless devices are out of range of the femtocell, or are otherwise not in a condition for wireless communication with the femtocell. That is, the femtocell may be configured to switch to the standby state if and only if a full or exhaustive count is zero.

In some embodiments, and/or under some conditions of some embodiments, the count of the designated wireless devices which are in a condition for wireless communication with the femtocell base station may be subject to termination when a predetermined termination condition is reached. In this case the count may not be a full or exhaustive count of all designated wireless devices. For example, the predetermined termination condition may be that the count reaches a predetermined nonzero value, such as one. A count subject to termination may be used when the femtocell is in the standby state, so that the femtocell switches to the active state if the count reaches one. The count may then be terminated, since for example the femtocell may be configured to switch to the active state regardless of whether or not additional designated wireless devices are registered by the count. This may increase efficiency by aborting the count once it reaches one, but letting the count continue as long as it is zero.

For example, a count subject to termination when a predetermined termination condition is reached may proceed by: (a) setting a counter c to zero; (b) setting an index variable j to 1, where the list of designated wireless devices is an ordered list having N entries; and (c) for j from 1 to N: (c1) evaluating a predetermined termination condition T(c), where T(c) is a function of the current count c; (c2) if T(c) corresponds to continuing the count, checking whether the $j^{th}$ wireless device in the list is in a condition for wireless communication with the femtocell base station, and, if so, incrementing the counter c by one; (c3) else if T(c) corresponds to termination of the count, terminating the count and returning the count c.

In some embodiments, a full or exhaustive count is equivalent to a count subject to a trivial termination condition. For example, if the termination condition T(c) corresponds to a rule that the count is to terminate if c=N and to continue otherwise, an exhaustive count of all the designated wireless devices will occur. Embodiments of the invention may therefore always use a count subject to termination, but vary the termination condition in different situations to obtain different results.

In embodiments of the present invention, operations such as determining whether any designated wireless devices are within communication range, determining whether all designated wireless devices are out of communication range, determining whether any designated wireless devices are associated with other base stations, determining whether all designated wireless devices are associated with other base stations, and the like, correspond to determining an operating condition indicative of a count of the designated wireless devices which are in a condition for wireless communication with the femtocell base station.

The invention will now be described with reference to specific examples. It will be understood that the following examples are intended to describe embodiments of the invention and are not intended to limit the invention in any way.

EXAMPLES

Example 1

Figure 4:
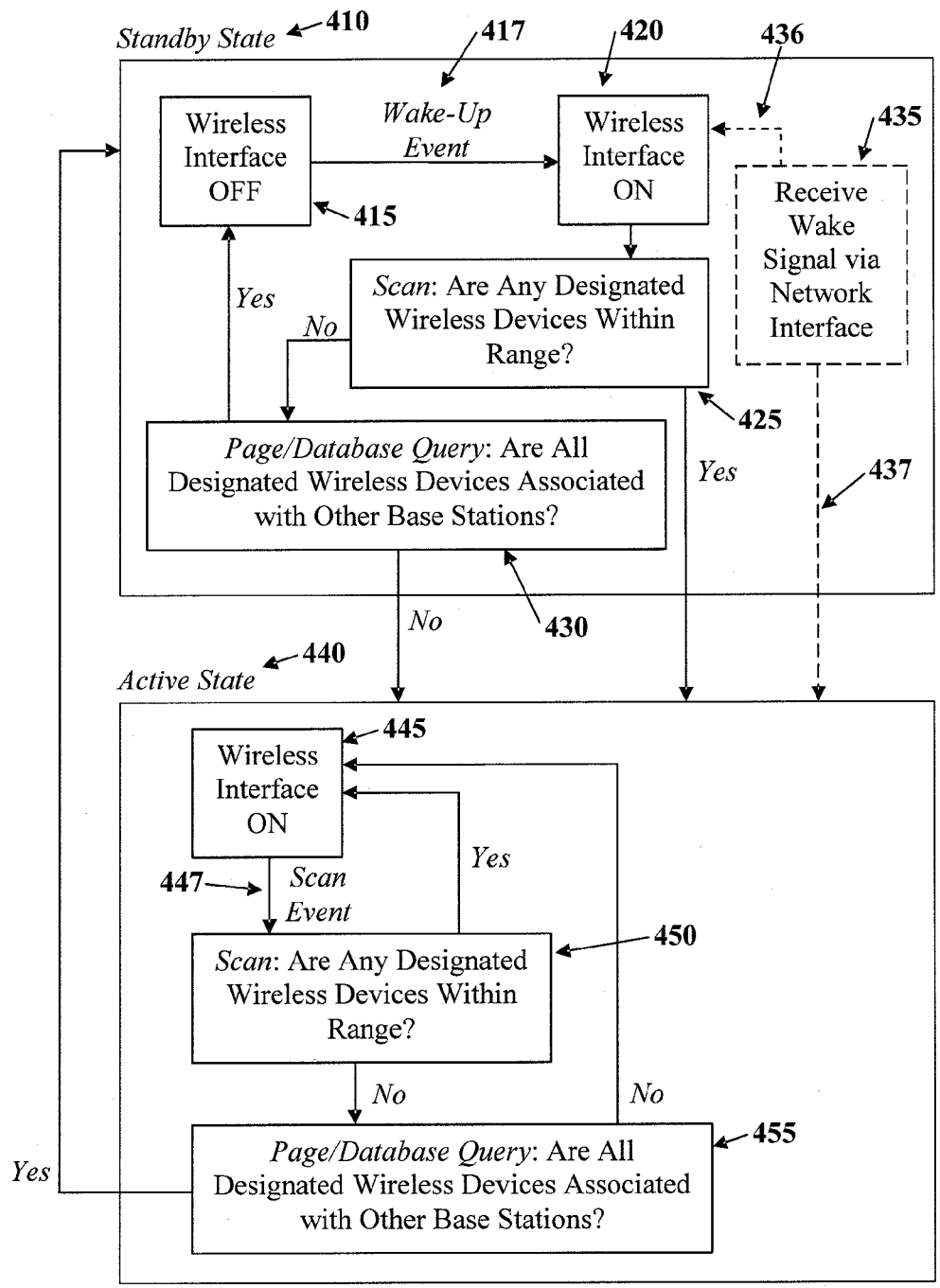
FIG. 4 illustrates a method for operating a femtocell base station in accordance with embodiments of the present invention.

FIG. 4 illustrates operations related to switching of a femtocell between a standby state 410 and an active state 440, in accordance with embodiments of the present invention. In this example, switching between states is performed using the scanning method in conjunction with a paging method and a data base query in accordance with a member self-updating method or network assisted method. In the standby state, the wireless interface may default to an OFF state 415 for predetermined periods of time. The OFF state 415 results in power savings at the femtocell and a reduction in potential interference due to radio activity. Wireless devices do not wirelessly communicate with the femtocell when the wireless interface is in the off state 415, however, in some embodiments, messages may still be received by the femtocell via its network interface, which may remain on substantially continuously or at least for predetermined periods during standby. The wireless interface transitions to an ON state 420 in response to a wake-up event 417. In some embodiments, the wake-up event 417 is generated in accordance with a schedule, such as a periodic or dynamic schedule. In some embodiments, the wake-up event 417 may be generated upon receipt of a message received by the femtocell network interface. In the ON state 420, the femtocell is temporarily able to wirelessly communicate, at least in a partial capacity, with wireless devices within wireless communication range. The femtocell then performs the scanning method to scan the wireless environment 425, to determine if any of the designated wireless devices are currently within communication range. This corresponds to a first activity in determining an operating condition of the femtocell indicative of a count of designated wireless devices which are in a condition for wireless communication with the femtocell. If at least one designated wireless device is within range, the femtocell transitions to the active state 440, thereby exiting a standby mode to support full femtocell operation. If no designated wireless devices are within range, the femtocell performs an additional check 430 corresponding to a paging method or local or remote database query associated with another method such as the member self-updating or network-assisted method. For example, each of the designated wireless devices may be paged to determine their current location, or alternatively a database query of the location of each designated wireless device may be performed. If, based on the additional check 430, all of the designated wireless are determined to be associated with other base stations, the wireless interface is turned off 415 and the femtocell idles until the next wake-up event 417. In some embodiments, if at least one designated wireless device is not accounted for as being associated with another base station due to the additional check 430, the femtocell transitions to the active state 440.

The additional check 430 may increase reliable operation of the femtocell, for example by verifying or falsifying results of the scan 425. The additional check 430 may also be used to enable dynamic scheduling of subsequent wake-up events 417, for example to schedule wake-up events based at least in part on distance to designated wireless devices associated with other base stations. In some embodiments, the additional check 430 may be omitted.

FIG. 4 further illustrates an active state 440, wherein the wireless interface is substantially always ON 445, thereby enabling servicing the designated wireless devices within communication range. The femtocell uses the active wireless interface to perform scan events 447 in accordance with a periodic or dynamic schedule. The schedule in the active state may differ from the schedule in the standby state. A scan 450 in response to a scan event 447 is configured to determine an operating condition of the femtocell indicative of whether or not any designated wireless devices are within range. If at least one designated wireless device is within range, the femtocell remains in the active state 440 with the wireless interface on 445. If no designated wireless devices are detected to be within communication range, the femtocell performs an additional check 455 corresponding to a paging method or local or remote database query associated with another method such as the member self-updating or network-assisted method. For example, each of the designated wireless devices may be paged to determine their current location, or alternatively a database query of the location of each designated wireless device may be performed. If, based on the additional check 455, all of the designated wireless devices are determined to be associated with other base stations, the femtocell enters the standby state 410. If at least one designated wireless device is not accounted for as being associated with another base station due to the additional check 455, the femtocell remains in the active state 440.

The additional check 455 may increase reliable operation of the femtocell, for example by verifying or falsifying results of the scan 450. The additional check 455 may also be used to enable dynamic scheduling of subsequent scan events 447. In some embodiments, the additional check 455 may be omitted.

In an alternative embodiment, the standby state may correspond to the wireless interface being turned OFF, while the active state may correspond to the wireless interface being turned on. Thus, in terms of FIG. 4, the standby state 410 may comprise elements 415, 417 and optionally 435 only, with the wake-up event 417 causing the femtocell to directly enter the ON state 445 of the active state. This results in operation similar to that described above, but with more uniformity between scanning and paging operations and frequencies thereof between the standby state and the active state.

In some embodiments, the femtocell may be further configured to react to receipt 435 of a wake signal received at the femtocell network interface. For example, the wake signal may be transmitted by an auxiliary device associated with a network operator core network, another femtocell or macrocell, or a designated wireless device. The wake signal may be indicative that a designated wireless device is within range of the femtocell, or that a designated wireless device is anticipated to be within range of the femtocell at a predetermined future time, or that a designated wireless device is not accounted for as being associated with another macrocell or femtocell, and therefore should be sought by the femtocell.

In some embodiments, receipt 435 of a wake signal may cause the femtocell to transition 436 to state 420, thereby turning its wireless interface ON to scan for wireless devices while technically remaining in the standby state 410. In a further embodiment, the additional check 430 may be explicitly enabled or inhibited upon receipt 435 of the wake signal. In some embodiments, receipt 435 of a wake signal may cause the femtocell to transition 437 to the active state 440.

Example 2

Figure 5:
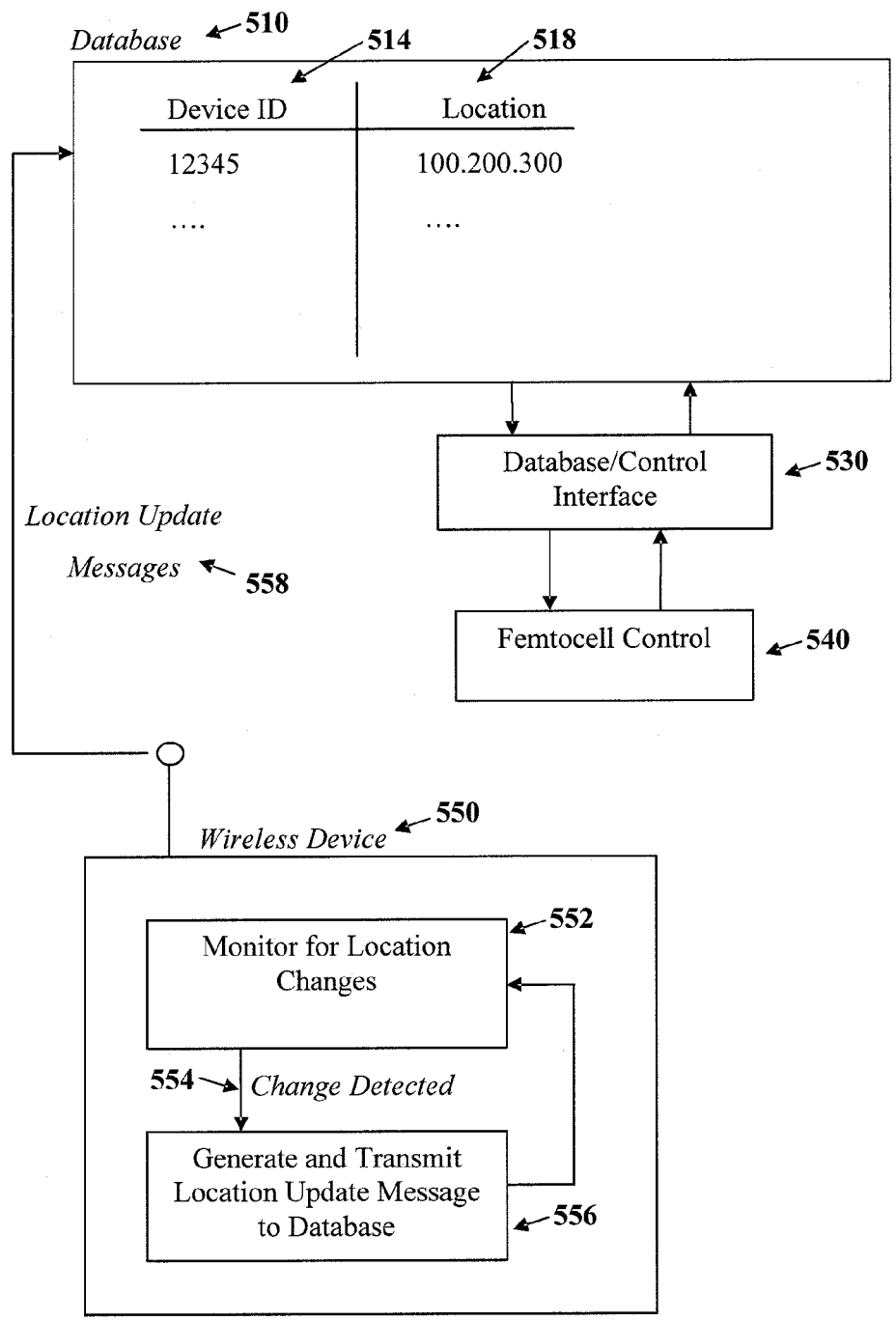
FIG. 5 illustrates a database configured for tracking wireless device locations and coupled to a femtocell base station in accordance with embodiments of the present invention.

FIG. 5 illustrates a database 510 configured to track current locations 518 of designated wireless devices 514 in accordance embodiments of with the present invention. The database may be queried by the femtocell in determining an operating condition of the femtocell and/or a count of designated wireless devices which are in a condition for wireless communication with the femtocell base station.

The database 510 may be maintained in accordance with the member self-updating method or another method, such as the network assisted method, as described herein. The database may be stored in memory of the femtocell or another device, such as an auxiliary device or server operatively coupled to the femtocell via the network interface.

As illustrated in FIG. 5, a designated wireless device 550 may be configured to monitor 552 for changes in its location. When a change 554 is detected, for example corresponding to handover between macrocells or femtocells, substantial change in GPS location, time zone, or operator network, or the like, the wireless device 550 generates and transmits 556 a location update message 558 to the database 510. If the wireless device 550 is remote from the femtocell, the location update message 558 is transmitted to a local base station and forwarded via a communication network to the database 510. For example, if the database 510 is contained within the femtocell, the location update message is received by a network interface thereof. If the wireless device 550 is within range of the femtocell containing the database 510, the location update message 558 may be transmitted to the database 510 via the femtocell network interface by transmitting the location update message 558 through another nearby macrocell or femtocell base station. If the femtocell's wireless interface is ON, the location update message 558 may be transmitted wirelessly to the femtocell, although in this case the location update message 558 may be superfluous. Upon receipt of a location update message 558, which contains a device identifier and a current location, the database 510 is updated.

The database is communicatively coupled or integrated within the femtocell control module. Two-way communication between the database and femtocell control 540 inputs and outputs are provided via a database-to-control interface 530. The database-to-control interface 530 may be configured to receive and respond to queries generated by the femtocell control module. In some embodiments, the database-to-control interface may be configured to generate alert messages for transmission to the femtocell control module upon detection of a predetermined condition within the database 510. For example, internal monitoring of the database may be performed to detect such a predetermined condition and trigger an alert message. In some embodiments, updating of the database 510 may trigger transmission of an alert message from the database-to-control interface 530 to a femtocell control 540 input.

In embodiments where the database is remote from the femtocell, the database-to-control interface 530 may be communicatively coupled to the femtocell control module via a communication network and at least a pair of network interfaces.

Example 3

Figure 6:
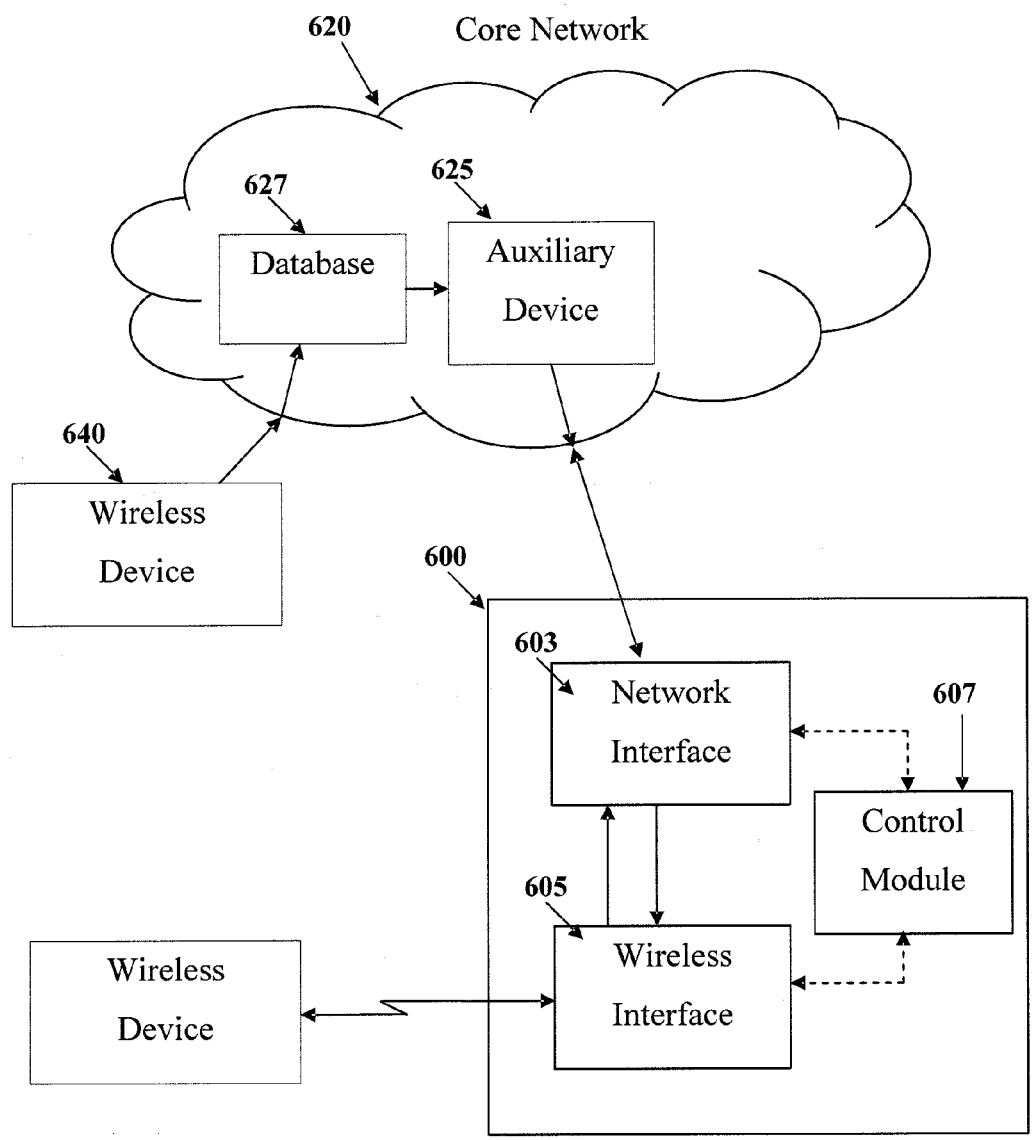
FIG. 6 illustrates a femtocell base station coupled to a core network in accordance with embodiments of the present invention.

FIG. 6 illustrates a femtocell 600 operatively coupled to an auxiliary device 625 residing in a network operator's core network 620 via a network interface 603 of the femtocell 600 in accordance with embodiments of the present invention. The auxiliary device may be a server or other computing device, and may incorporate or be operatively coupled to a database 627. The database 627 is configured to track current locations of designated wireless devices, such as wireless device 640. The database 627 may be responsive to queries generated by the auxiliary device 625. The auxiliary device 625 may generate queries autonomously in accordance with a predetermined schedule, and/or receive and forward queries generated by the femtocell 600.

In some embodiments, the auxiliary device 625 may be configured to generate and transmit alert messages to the femtocell 600. For example an alert message may be generated in response to a predetermined condition of the database 627 indicative that the designated wireless device 640 is currently unaccounted for, that the designated wireless device is or is about to be within communication range of the femtocell 600, or the like.

The femtocell comprises a control module 607 which, in response to information received from the auxiliary device 625 via the network interface 603, may switch the femtocell between standby and active states. This may include switching the wireless interface 605 of the femtocell ON or OFF. The control module 607 may also be configured to generate queries for transmission by the network interface 603 to the auxiliary device 625.

Example 4

Figure 7:
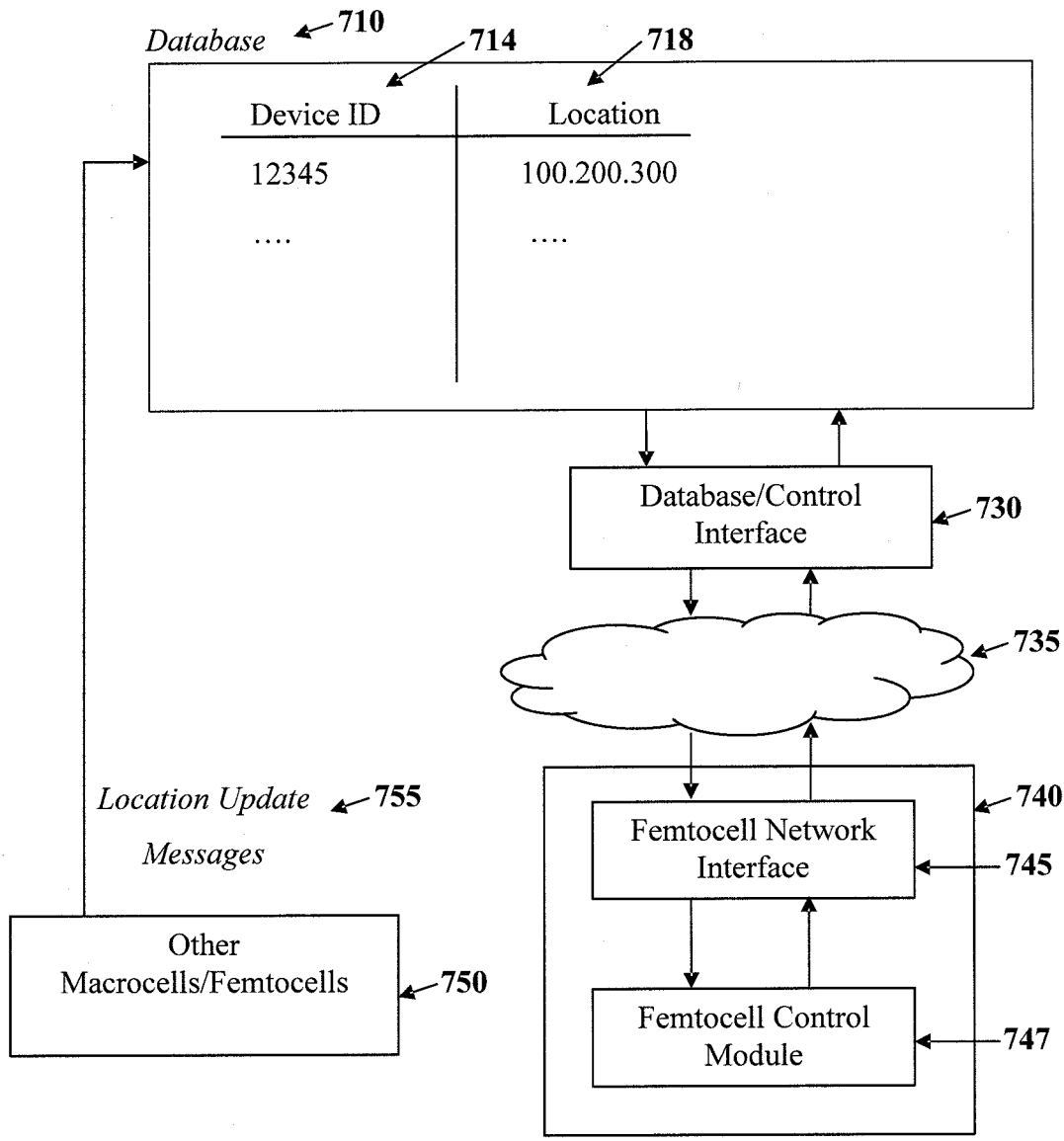
FIG. 7 illustrates a database configured for tracking wireless device locations and coupled to a femtocell base station in accordance with embodiments of the present invention.

FIG. 7 illustrates a database 710 configured to track current locations 718 of designated wireless devices 714 in accordance with embodiments of the present invention. The database may be queried by a femtocell 740 for determining an operating condition of the femtocell 740 and/or a count of designated wireless devices associated therewith which are in a condition for wireless communication.

The database 710 may be maintained in accordance with the member self-updating method or another method, such as the network assisted method, as described herein. The database may be stored in memory of an auxiliary device or server within an operator core network and operatively coupled to a control module 747 of the femtocell 740 via a database-to-control interface 730 associated with the database, a communication network 735, and a network interface 745 of the femtocell.

As illustrated in FIG. 7, a plurality of macrocell and/or femtocell base stations 750 may be configured to monitor for changes in location of wireless devices. When such a change in location is detected, for example corresponding to handover between macrocells or femtocells, a base station generates and transmits, via a communication network, a location update message 755 to the database 710. Upon receipt of a location update message 755, which contains a device identifier and a current location of the wireless device, the database 710 is updated. In some embodiments, maintaining and updating of the database 710 may be performed by a network operator, in accordance with established procedures as would be readily understood by a worker skilled in the art.

The database 710 is communicatively coupled to the femtocell 740 via a communication network 735. Two-way communication between the database and the femtocell 740 are provided via a database-to-control interface 730 and the femtocell network interface 745. The database-to-control interface 730 may be configured to receive and respond to queries generated by the femtocell 740. In some embodiments, the database-to-control interface may be configured to generate alert messages for transmission to the femtocell 740 upon detection of a predetermined condition within the database 710. For example, internal monitoring of the database may be performed to detect such a predetermined condition and trigger an alert message. In some embodiments, updating of the database 710 may trigger transmission of an alert message from the database-to-control interface 730 to a femtocell network interface 745.

Example 5

Figure 8:
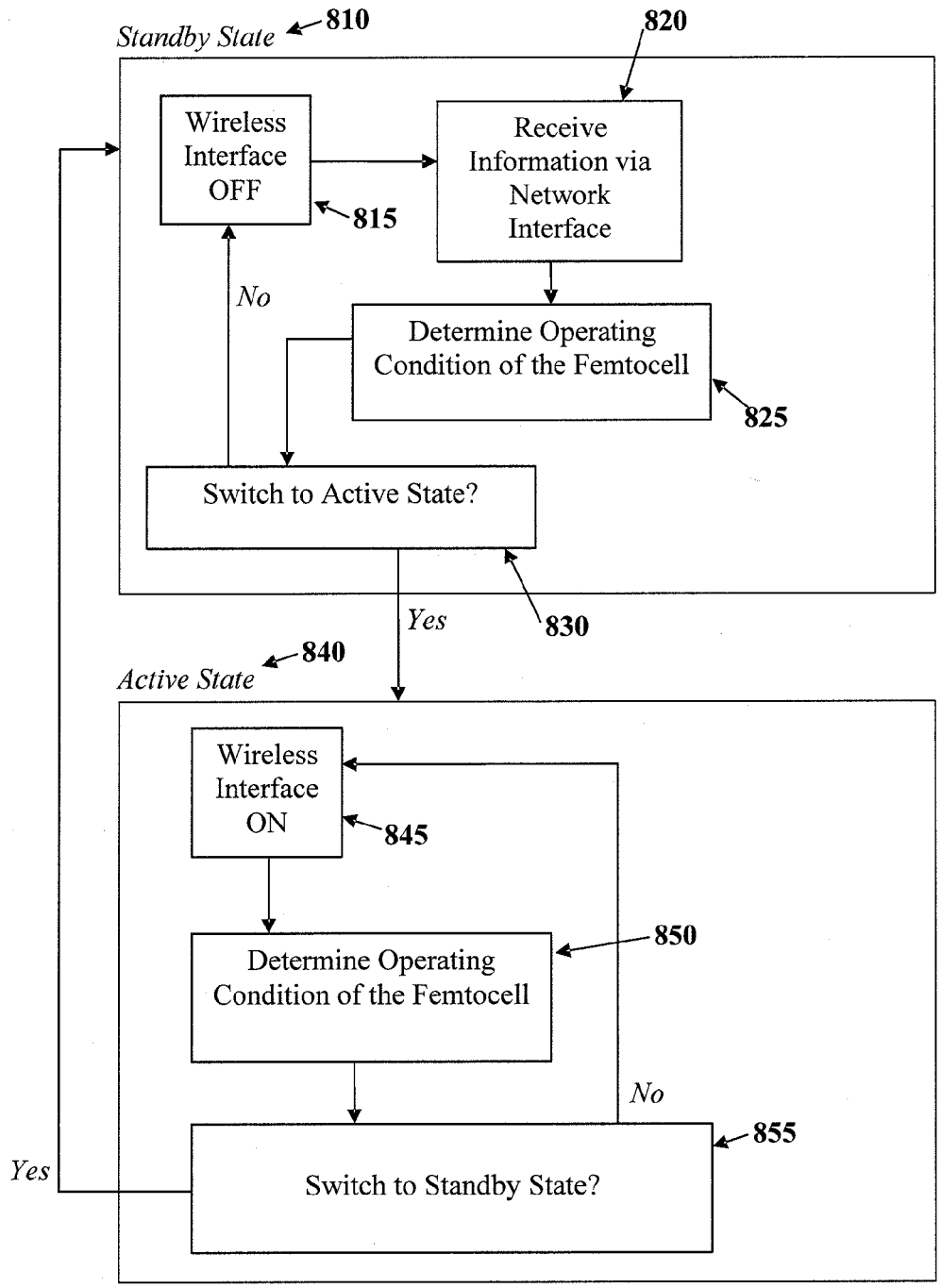
FIG. 8 illustrates a method for operating a femtocell base station in accordance with embodiments of the present invention.

FIG. 8 illustrates operations related to switching of a femtocell between a standby state 810 and an active state 840, in accordance with embodiments of the present invention. In the standby state, the wireless interface is in an OFF state 815. Wireless devices do not wirelessly communicate with the femtocell when the wireless interface is in the off state 815. However, the femtocell may still receive information via its network interface 820, which may remain on substantially continuously or at least for predetermined periods during standby.

During the standby state, an operating condition of the femtocell is determined 825, for example periodically, in accordance with a schedule, and/or upon reception of a signal received by the femtocell network interface. Determination 825 of the operating condition is based at least in part on information 820 received via the network interface. For example, determination 825 may comprise one or more network-based methods such as a paging method, member self-updating method, or network-assisted method, as described herein. Based on the determination 825, the method comprises determining whether to switch to the active state 830, or to remain in the standby state.

In some embodiments, determination 825 may comprise a scanning method as a secondary method to verify operating conditions of designated wireless devices. For example, upon determining, using one or more network-based methods, that there is at least a predetermined likelihood of one or more designated wireless devices being in a condition for wireless communication with the femtocell, a scan may be performed to verify such an operating condition. Alternatively, the scan may be deferred to the active state 840.

FIG. 8 further illustrates an active state 840, wherein the wireless interface is substantially always ON 845, thereby enabling servicing the designated wireless devices within communication range.

During the active state 840, an operating condition of the femtocell is determined 850, for example periodically, in accordance with a schedule, and/or upon reception of a signal received by the femtocell network interface. Determination 850 of the operating condition may be based at least in part on information received via the network interface (not shown) and/or on information received via the wireless interface. For example, determination 850 may comprise a scanning method and/or one or more network-based methods such as a paging method, member self-updating method, or network-assisted method, as described herein. Based on the determination 850, the method comprises determining whether to switch to the standby state 855, or to remain in the active state.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java, PI/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for operating a femtocell base station, the method comprising:
   a. obtaining, by the femtocell base station, a list of one or more designated wireless devices capable of wireless communication with the femtocell base station;
   b. determining, by the femtocell base station, an operating condition of the femtocell base station, the operating condition indicative of a count of the designated wireless devices which are in a condition for wireless communication with the femtocell base station; and
   c. switching, by the femtocell base station, the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state,
   wherein determining the operating condition comprises paging one or more of the designated wireless devices via one or more cellular base stations other than the femtocell base station, each of the one or more designated wireless devices configured to respond to said paging by providing an indication of location for provision to the femtocell base station via a network interface of the femtocell base station, and wherein the count of the designated wireless devices which are in the condition for wireless communication with the femtocell base station is based at least in part on said indications of location.

2. The method according to claim 1, wherein a wireless interface of the femtocell base station is powered down during the standby state, and wherein determining the operating condition during the standby state comprises use of the network interface of the femtocell base station.

3. The method according to claim 1, wherein determining the operating condition comprises scanning the wireless environment to determine a count of designated wireless devices within wireless communication range of the femtocell base station.

4. The method according to claim 1, wherein determining the operating condition comprises querying a database to determine location information related to one or more designated wireless devices.

5. The method according to claim 4, wherein the database is stored in memory of the femtocell base station, and wherein the designated wireless devices are configured to transmit messages to the femtocell base station for updating the database.

6. The method according to claim 1, wherein determining the operating condition is performed in accordance with a schedule.

7. The method according to claim 6, wherein the schedule is determined dynamically based at least in part on location information related to the one or more designated wireless devices.

8. The method according to claim 6, wherein determining the operating condition is performed during wake-up events, said wake-up events generated in accordance with the schedule, and wherein a scheduled frequency of the wake-up events increases as more of the designated wireless devices are determined to be in locations closer to the femtocell base station, based on the location information.

9. The method according to claim 1, wherein determining the operating condition is performed upon receipt of a wake message by the femtocell base station.

10. The method according to claim 1, wherein a wireless interface of the femtocell base station is configured to transition to an ON state in response to a wake-up event, wherein the wake-up event is generated in accordance with a dynamic schedule, and wherein the schedule is based at least in part on determined distances to the one or more designated wireless devices associated with other base stations.

11. The method according to claim 1, wherein the femtocell base station is configured to determine the operating condition in response to wake-up events, wherein a time interval between wake-up events is changed dynamically based on feedback related to usage history of the designated wireless devices.

12. A femtocell base station comprising:
 a. a wireless interface configured for wireless communication with one or more wireless devices at least when the femtocell base station is in an active state;
 b. a network interface coupled to the wireless interface; the network interface configured for communicative coupling with a communication network; and
 c. a control module operatively coupled to one or both of the wireless interface and the network interface, the control module comprising at least one data processor configured to:
  i. obtain a list of one or more designated wireless devices capable of wireless communication with the femtocell base station;
  ii. determine an operating condition of the femtocell base station, the operating condition indicative of a count of the designated wireless devices which are in a condition for wireless communication with the femtocell base station; and
  iii. switch the femtocell base station between the active state and a standby state based on the operating condition, wherein the femtocell base station facilitates communication between one or more wireless devices and the communication network when in the active state, and wherein the standby state corresponds to reduced operation of the femtocell base station compared with the active state,
 wherein to determine the operating condition the control module is configured to page one or more of the designated wireless devices via one or more cellular base stations other than the femtocell base station, each of the one or more designated wireless devices configured to respond to said paging by providing an indication of location for provision to the femtocell base station via the network interface, and wherein the count of the designated wireless devices which are in the condition for wireless communication with the femtocell base station is based at least in part on said indications of location.

13. The femtocell base station according to claim 12, wherein the wireless interface is powered down during the standby state, and wherein determining the operating condition during the standby state comprises use of the network interface.

14. The femtocell base station according to claim 12, wherein determining the operating condition comprises scanning, using the wireless interface, the wireless environment to determine a count of designated wireless devices within wireless communication range of the femtocell base station.

15. The femtocell base station according to claim 12, wherein determining the operating condition comprises querying a database to determine location information related to one or more designated wireless devices.

16. The femtocell base station according to claim 15, wherein the database is stored in memory of the femtocell base station, and wherein the designated wireless devices are configured to transmit messages to the femtocell base station for updating the database.

17. The femtocell base station according to claim 12, wherein determining the operating condition is performed in accordance with a schedule.

18. The method according to claim 17, wherein the schedule is determined dynamically based at least in part on location information related to the one or more designated wireless devices.

19. The femtocell base station according to claim 12, wherein determining the operating condition is performed upon receipt of a wake message by the network interface.

20. A computer program product comprising a memory having computer readable code embodied therein, for execution by at least one CPU, for performing a method for operating a femtocell base station, the method comprising:
 a. obtaining a list of one or more designated wireless devices capable of wireless communication with the femtocell base station;
 b. determining an operating condition of the femtocell base station, the operating condition indicative of a count of the designated wireless devices which are in a condition for wireless communication with the femtocell base station; and
 switching the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state;

wherein determining the operating condition comprises paging one or more of the designated wireless devices via one or more cellular base stations other than the femtocell base station, each of the one or more designated wireless devices configured to respond to said paging by providing an indication of location for provision to the femtocell base station via a network interface of the femtocell base station, and wherein the count of the designated wireless devices which are in the condition for wireless communication with the femtocell base station is based at least in part on said indications of location.

21. A method for operating a femtocell base station, the method comprising:
  a. obtaining, by the femtocell base station, a list of designated wireless devices capable of wireless communication with the femtocell base station;
  b. in response to one of the designated wireless devices joining another base station, transmitting an update message from said one of the designated wireless devices to the femtocell base station, the update message communicated at least in part via the communication network to a network interface of the femtocell base station, the update message comprising an indication of location of said one of the designated wireless devices;
  c. determining, by the femtocell base station, an operating condition of the femtocell base station, the operating condition indicative of a count of the designated wireless devices which are in a condition for wireless communication with the femtocell base station, wherein the count is based at least in part on said indication of location; and
  d. switching, by the femtocell base station, the femtocell base station between an active state and a standby state based on the operating condition, wherein the femtocell base station facilitates communication between one or more wireless devices and a communication network when in the active state, and wherein the standby state corresponds to reduced operation of the femtocell base station compared with the active state.

* * * * *